(12) United States Patent
Tsirigotis et al.

(10) Patent No.: US 8,131,689 B2
(45) Date of Patent: Mar. 6, 2012

(54) ACCUMULATING ACCESS FREQUENCY AND FILE ATTRIBUTES FOR SUPPORTING POLICY BASED STORAGE MANAGEMENT

(76) Inventors: Panagiotis Tsirigotis, Sunnyvale, CA (US); Geetha Srikantan, Palo Alto, CA (US); Thomas K. Wong, Pleasanton, CA (US); Chi Ming Wong, San Francisco, CA (US); Anand Iyengar, Mountain View, CA (US); Rajeev Chawla, Union City, CA (US); Richard Simpkins, Mountain View, CA (US); Zuwei Liu, Cupertino, CA (US); Gaurav Gupta, Mountain View, CA (US); Matthew Seitz, San Jose, CA (US); Yu Cheong Chan, Mountain View, CA (US)

( * ) Notice: Subject to any disclaimer, the term of this patent is extended or adjusted under 35 U.S.C. 154(b) by 1057 days.

(21) Appl. No.: 11/537,997

(22) Filed: Oct. 2, 2006

(65) Prior Publication Data
US 2007/0136308 A1    Jun. 14, 2007

Related U.S. Application Data
(63) Continuation-in-part of application No. 11/241,554, filed on Sep. 30, 2005.

(51) Int. Cl.
*G06F 17/00* (2006.01)
(52) U.S. Cl. ........ 707/694; 707/822; 707/827; 707/828; 709/201; 709/203; 709/219; 709/221
(58) Field of Classification Search .............. 707/1, 694; 709/201
See application file for complete search history.

(56) References Cited

U.S. PATENT DOCUMENTS

| 5,465,335 | A | 11/1995 | Anderson |
| 5,689,701 | A | 11/1997 | Ault et al. |
| 5,774,715 | A | 6/1998 | Madany et al. |
| 5,832,261 | A | 11/1998 | Ishizaka et al. |
| 5,890,169 | A | 3/1999 | Wong et al. |
| 5,933,825 | A | 8/1999 | McClaughry et al. |
| 5,951,656 | A | 9/1999 | Finnell |
| 6,070,254 | A | 5/2000 | Pratt et al. |

(Continued)

FOREIGN PATENT DOCUMENTS
EP    0 108 338 A2    5/1984
(Continued)

OTHER PUBLICATIONS

Anderson, D.C. et al., "Interposed Request Routing for Scalable Network Storage," ACM Transactions on Computer Systems, Feb. 2002, vol. 20, No. 1, pp. 1-24.

(Continued)

*Primary Examiner* — Charles Rones
*Assistant Examiner* — Mellissa M Chojnacki
(74) *Attorney, Agent, or Firm* — Weaver Austin Villeneuve and Sampson LLP

(57) ABSTRACT

A system and method for performing policy-based storage management using data related to access frequency and file attribute accumulation. A switch device provides transparency for transactions between a client and a storage network. The transparency allows objects (e.g., files or directories) to be moved (e.g., migrated) on the storage network without affecting a reference to the object used by the client (e.g., a file handle). A monitoring module generates accumulation data associated with the transactions for use in policy-based management. The accumulation data can describe uses of the file such as how often certain files are accessed, modifications to files such as creations of new directories or files, and other uses.

25 Claims, 10 Drawing Sheets

U.S. PATENT DOCUMENTS

| | | | |
|---|---|---|---|
| 6,101,508 | A | 8/2000 | Wolff |
| 6,192,408 | B1 | 2/2001 | Vahalia et al. |
| 6,314,460 | B1 | 11/2001 | Knight et al. |
| 6,341,302 | B1 | 1/2002 | Celis |
| 6,353,837 | B1 | 3/2002 | Blumenau |
| 6,389,427 | B1 | 5/2002 | Faulkner |
| 6,408,298 | B1 | 6/2002 | Van et al. |
| 6,442,548 | B1 | 8/2002 | Balabine et al. |
| 6,453,354 | B1 | 9/2002 | Jiang et al. |
| 6,473,401 | B1 | 10/2002 | Kong et al. |
| 6,606,690 | B2 | 8/2003 | Padovano |
| 6,615,365 | B1 | 9/2003 | Jenevein et al. |
| 6,633,887 | B2 | 10/2003 | Suzuki et al. |
| 6,694,431 | B1 | 2/2004 | Binding et al. |
| 6,697,846 | B1 | 2/2004 | Soltis |
| 6,711,625 | B1 | 3/2004 | Simpson |
| 6,738,883 | B2 | 5/2004 | March et al. |
| 6,931,410 | B2 | 8/2005 | Anderson et al. |
| 6,938,039 | B1 | 8/2005 | Bober et al. |
| 6,983,379 | B1 * | 1/2006 | Spalink et al. ........ 705/10 |
| 6,985,956 | B2 | 1/2006 | Luke et al. |
| 6,996,714 | B1 | 2/2006 | Halasz et al. |
| 7,054,927 | B2 | 5/2006 | Ulrich et al. |
| 7,072,917 | B2 | 7/2006 | Wong et al. |
| 7,089,293 | B2 * | 8/2006 | Grosner et al. ........ 709/217 |
| 7,092,976 | B2 | 8/2006 | Curran et al. |
| 7,096,253 | B2 | 8/2006 | Vinson et al. |
| 7,103,628 | B2 | 9/2006 | Neiman et al. |
| 7,120,666 | B2 | 10/2006 | McCanne et al. |
| 7,127,477 | B2 | 10/2006 | Duncombe et al. |
| 7,254,636 | B1 | 8/2007 | O'Toole et al. |
| 7,272,613 | B2 | 9/2007 | Sim et al. |
| 7,272,654 | B1 | 9/2007 | Brendel |
| 7,308,473 | B1 | 12/2007 | Thomas et al. |
| 7,308,709 | B1 | 12/2007 | Brezak et al. |
| 7,313,579 | B2 | 12/2007 | Murotani |
| 7,324,995 | B2 | 1/2008 | Findleton et al. |
| 7,346,664 | B2 | 3/2008 | Wong et al. |
| 7,386,610 | B1 | 6/2008 | Vekiarides |
| 7,441,011 | B2 | 10/2008 | Lin et al. |
| 7,475,142 | B2 | 1/2009 | Sharma et al. |
| 7,512,673 | B2 | 3/2009 | Miloushev et al. |
| 7,562,110 | B2 | 7/2009 | Miloushev et al. |
| 7,587,422 | B2 | 9/2009 | Wong et al. |
| 7,587,471 | B2 | 9/2009 | Yasuda et al. |
| 7,720,796 | B2 | 5/2010 | Wong et al. |
| 7,831,641 | B2 | 11/2010 | Wong et al. |
| 7,844,646 | B1 | 11/2010 | Deshmukh et al. |
| 2002/0013832 | A1 | 1/2002 | Hubbard |
| 2002/0111929 | A1 | 8/2002 | Pudipeddi et al. |
| 2002/0120763 | A1 | 8/2002 | Miloushev et al. |
| 2002/0133491 | A1 | 9/2002 | Sim et al. |
| 2002/0154645 | A1 | 10/2002 | Hu et al. |
| 2002/0161855 | A1 | 10/2002 | Manczak et al. |
| 2002/0184244 | A1 | 12/2002 | Hsiao et al. |
| 2002/0199060 | A1 | 12/2002 | Peters et al. |
| 2003/0037061 | A1 | 2/2003 | Sastri et al. |
| 2003/0046270 | A1 | 3/2003 | Leung et al. |
| 2003/0046335 | A1 | 3/2003 | Doyle et al. |
| 2003/0056112 | A1 | 3/2003 | Vinson et al. |
| 2003/0110263 | A1 | 6/2003 | Shillo |
| 2003/0120948 | A1 | 6/2003 | Schmidt et al. |
| 2003/0126247 | A1 | 7/2003 | Strasser et al. |
| 2003/0140051 | A1 | 7/2003 | Fujiwara et al. |
| 2003/0154236 | A1 | 8/2003 | Dar et al. |
| 2003/0177178 | A1 | 9/2003 | Jones et al. |
| 2003/0182313 | A1 | 9/2003 | Federwisch et al. |
| 2003/0195903 | A1 | 10/2003 | Manley et al. |
| 2003/0204613 | A1 | 10/2003 | Hudson et al. |
| 2003/0204670 | A1 | 10/2003 | Holt et al. |
| 2003/0220899 | A1 | 11/2003 | Numanoi et al. |
| 2003/0220985 | A1 | 11/2003 | Kawamoto et al. |
| 2004/0010714 | A1 | 1/2004 | Stewart |
| 2004/0024963 | A1 | 2/2004 | Talagala et al. |
| 2004/0054748 | A1 | 3/2004 | Ackaouy et al. |
| 2004/0078465 | A1 | 4/2004 | Coates et al. |
| 2004/0088297 | A1 | 5/2004 | Coates et al. |
| 2004/0103104 | A1 | 5/2004 | Hara et al. |
| 2004/0117438 | A1 | 6/2004 | Considine et al. |
| 2004/0133577 | A1 | 7/2004 | Miloushev et al. |
| 2004/0133606 | A1 | 7/2004 | Miloushev et al. |
| 2004/0133650 | A1 | 7/2004 | Miloushev et al. |
| 2004/0133652 | A1 | 7/2004 | Miloushev et al. |
| 2004/0139167 | A1 | 7/2004 | Edsall et al. |
| 2004/0153481 | A1 | 8/2004 | Talluri |
| 2004/0186849 | A1 | 9/2004 | Enko et al. |
| 2004/0267752 | A1 | 12/2004 | Wong et al. |
| 2004/0267831 | A1 | 12/2004 | Wong et al. |
| 2005/0033932 | A1 | 2/2005 | Pudipeddi et al. |
| 2005/0055402 | A1 | 3/2005 | Sato |
| 2005/0080981 | A1 | 4/2005 | Archambault et al. |
| 2005/0125503 | A1 | 6/2005 | Iyengar |
| 2005/0188211 | A1 | 8/2005 | Scott et al. |
| 2005/0198062 | A1 * | 9/2005 | Shapiro ........ 707/102 |
| 2005/0262102 | A1 | 11/2005 | Anderson et al. |
| 2006/0080371 | A1 | 4/2006 | Wong et al. |
| 2006/0129627 | A1 | 6/2006 | Phillips et al. |
| 2006/0161746 | A1 | 7/2006 | Wong et al. |
| 2006/0253501 | A1 | 11/2006 | Langan et al. |
| 2006/0271598 | A1 | 11/2006 | Wong et al. |
| 2007/0024919 | A1 | 2/2007 | Wong et al. |
| 2007/0074207 | A1 | 3/2007 | Bates et al. |
| 2008/0114854 | A1 | 5/2008 | Wong et al. |

FOREIGN PATENT DOCUMENTS

| | | |
|---|---|---|
| EP | 0 926 585 | 6/1999 |
| EP | 1 209 556 | 5/2002 |
| EP | 1 311 122 A2 | 5/2003 |
| EP | 1 396 789 A2 | 3/2004 |
| JP | HEI 04-299747 | 10/1992 |
| JP | HEI 10-247155 | 9/1998 |
| JP | 2001-075843 | 3/2001 |
| JP | 2004-054607 | 2/2004 |
| JP | 2004-110290 | 4/2004 |
| JP | 2005/502096 | 1/2005 |
| WO | 2004/097686 | 4/2004 |
| WO | WO2004/053677 | 6/2004 |
| WO | 2004/097571 | 11/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | WO2006/080371 | 8/2006 |
| WO | 2007/014156 | 10/2006 |
| WO | 2007/002855 | 1/2007 |

OTHER PUBLICATIONS

Bright, J.D. et al., "A Scalable Architecture for Clustered Network Attached Storage," Twentieth IEEE/Eleventh NASA Goddard Conference on Mass Storage Systems & Technologies, Apr. 7-10, 2003, 12 pages, Paradise Point Resort, San Diego, CA, USA.

Goldick, J., "Retry of Extending Networking Design Notes," PSC, Carnegie-Mellon University, Feb. 1995, 42 pages.

"Leveraging the Benefits of the EMC CLARiiON IP4700 Network File Server With the Oracle8i Database," an Engineering White Paper, Mar. 5, 2002, EMC Corporation.

Notification of Transmittal of the International Search Report and the Written Opinion, PCT/US04/12841, Oct. 13, 2004, 9 pages.

"Notification of Transmittal of the International Search Report and the Written Opinion of the International Searching Authority, or the Declaration," for PCT/US04/12844, Mar. 14, 2005, 14 pages.

Notification of Transmittal of the International Search Report and Written Opinion, PCT/US04/12846, Sep. 28, 2004, 8 pages.

Notification of Transmittal of the International Search Report and Written Opinion, PCT/US04/12847, Nov. 3, 2004, 7 pages.

Notification of Transmittal of the International Search Report and the Written Opinion, PCT/US04/30180, Mar. 27, 2006, 8 pages.

U.S. Appl. No. 60/478,154, filed Apr. 24, 2003.

Office Action mailed Jan. 3, 2007 for U.S. Appl. No. 10/832,785.

Final Office Action mailed Aug. 31, 2007 for U.S. Appl. No. 10/832,785.

Office Action, U.S. Appl. No. 10/832,785, mailed May 28, 2008.

Final Office Action mailed Jan. 5, 2009 for U.S. Appl. No. 10/832,785.

Office Action, U.S. Appl. No. 10/832,785, mailed Jun. 8, 2009.

U.S. Appl. No. 60/465,578, filed Apr. 24, 2003.
Office Action mailed Dec. 18, 2006 for U.S. Appl. No. 10/831,701.
Final Office Action mailed Sep. 12, 2007, for U.S. Appl. No. 10/831,701.
Office Action, U.S. Appl. No. 10/831,701, mailed Jun. 25, 2008.
Final Office Action, U.S. Appl. No. 10/831,701, mailed Jan. 5, 2009.
Notice of Allowance, U.S. Appl. No. 10/831,701, mailed May 14, 2009.
Allowed Claims, U.S. Appl. No. 10/831,701.
Office Action mailed Jan. 11, 2008, for U.S. Appl. No. 11/324,845.
Final Office Action, U.S. Appl. No. 11/324,845, mailed Sep. 5, 2008, 2008.
Office Action mailed Feb. 9, 2009, for U.S. Appl. No. 11/324,845.
Notice of Allowance mailed Sep. 21, 2009, for U.S. Appl. No. 11/324,845.
Notice of Allowance mailed Dec. 2, 2009, for U.S. Appl. No. 11/324,845.
U.S. Appl. No. 60/465,579, filed Apr. 24, 2003.
Office Action mailed Mar. 23, 2007, for U.S. Appl. No. 10/831,376.
Final Office Action mailed Aug. 10, 2007, for U.S. Appl. No. 10/831,376.
Notice of Allowance mailed Oct. 22, 2007, for U.S. Appl. No. 10/831,376.
Allowed Claims, U.S. Appl. No. 10/831,376.
Office Action, U.S. Appl. No. 11/241,554, mailed Aug. 8, 2007.
Final Office Action, U.S. Appl. No. 11/241,554, mailed Jul. 25, 2008.
Office Action, U.S. Appl. No. 11/241,554, mailed Jan. 8, 2009.
Final Office Action, U.S. Appl. No. 11/241,554, mailed Aug. 19, 2009.
Examiner Interview, U.S. Appl. No. 11/241,554, mailed Sep. 30, 2009.
Office Action, U.S. Appl. No. 11/395,118, mailed Jun. 10, 2009.
U.S. Appl. No. 60/465,580, filed Apr. 24, 2003.
Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927.
U.S. Appl. No. 60/503,190, filed Sep. 15, 2003.
Non-Final Office Action dated Jan. 8, 2009 for U.S. Appl. No. 10/942,762.
Final Office Action dated Jul. 21, 2009 for U.S. Appl. No. 10/942,762.
U.S. Appl. No. 60/615,002, filed Sep. 30, 2004.
U.S. Appl. No. 60/641,217, filed Dec. 31, 2004.
International Preliminary Report on Patentability dated Apr. 10, 2008 for PCT Application No. PCT/US2006/038361.
International Search Report sent Sep. 30, 2008 for PCT Application No. PCT/US05/35624.
Written Opinion sent Sep. 30, 2008 for PCT Application No. PCT/US05/35624.
International Search Report mailed May 8, 2007 for PCT Application No. US/2006/25430.
Written Opinion mailed May 8, 2007 for PCT Application No. US/2006/25430.
European Search Report dated Dec. 4, 2008 for EP Patent Application No. 04750678.7.
European Office Action dated Apr. 9, 2009 for EP Patent Application No. 04750678.7.
U.S. Appl. No. 60/667,567, filed Mar. 31, 2005, Wong et al.
U.S. Appl. No. 60/722,465, filed Sep. 30, 2005, Tsirigotis et al.
Yamakawa et al., (Aug. 22, 2002) "NAS Switch: NFS Server Virtualization", Internet Systems Research Laboratories, NEC Corporation, published by Institute of Electronics, Information and Communication Engineers, Japan, 102(275):13-18.
US Advisory Action dated Nov. 21, 2007 issued in U.S. Appl. No. 10/832,785.
US Notice of Allowance dated Dec. 29, 2009 issued in U.S. Appl. No. 10/832,785.
US Notice of Allowance dated Apr. 21, 2010 issued in U.S. Appl. No. 10/832,785.
US Advisory Action dated Nov. 27, 2007 issued in U.S. Appl. No. 10/831,701.
US Advisory Action dated Nov. 21, 2008 issued in U.S. Appl. No. 11/324,845.
US Notice of Allowance dated Mar. 16, 2010 issued in U.S. Appl. No. 11/324,845.
US Examiner Interview Summary Application dated Mar. 31, 2009 issued in U.S. Appl. No. 11/241,554.
US Office Action dated Feb. 5, 2010 issued in U.S. Appl. No. 11/241,554.
US Final Office Action Final dated Feb. 18, 2010 issued in U.S. Appl. No. 11/395,118.
US Office Action Final dated Jan. 15, 2010 issued in U.S. Appl. No. 10/942,762.
European Second Office Action dated Feb. 22, 2010 issued in EP Patent Application No. 04750678.7.
Japanese Office Action dated Dec. 22, 2009 issued in JP Patent Application No. 2006-513342.
PCT International Search Report dated Aug. 29, 2007 issued in PCT/US2006/038361.
PCT International Preliminary Report on Patentability and Written Opinion dated Aug. 29, 2007 issued in PCT/US2006/038361.
Chinese First Office Action dated Nov. 20, 2009 issued in CN Patent Application No. 200680032142.X.
US Office Action Final dated Jul. 21, 2010 issued in U.S. Appl. No. 11/241,554.
European Supplementary Search Report dated Jun. 4, 2010 issued in EP 06 81 5981.
US Notice of Allowance and Examiner-Initiated Interview Summary dated Aug. 9, 2010 issued in U.S. Appl. No. 10/832,785.
US Examiner Interview Summary dated Sep. 14, 2010 issued in U.S. Appl. No. 11/241,554.
US Office Action dated Mar. 11, 2011 issued in U.S. Appl. No. 11/395,118.
US Office Action dated Sep. 22, 2010 issued in U.S. Appl. No. 12/019,582.
US Final Office Action dated Feb. 25, 2011 issued in U.S. Appl. No. 12/019,582.
US Notice of Allowance dated Jun. 15, 2011 issued in U.S. Appl. No. 12/019,582.
US Office Action Final dated Aug. 3, 2010 issued in U.S. Appl. No. 10/942,762.
US Examiner Interview Summary dated Oct. 12, 2010 issued in U.S. Appl. No. 10/942,762.
US Office Action dated Jan. 20, 2011 issued in U.S. Appl. No. 11/478,998.
European Examination Report dated Nov. 9, 2010 issued in 04 750 678.7-1245.
PCT International Preliminary Report on Patentability and Written Opinion dated Jan. 9, 2008 issued in PCT/US2006/25430.
European Extended Search Report, Supplementary Search Report and Search Opinion dated Feb. 25, 2011 issued in EP 06 785 872.0.
Carns et al., (Oct. 1, 2000) "PVFS: A Parallel File System for Linux Clusters", Proceedings of the 4th Annual Linux Showcase and Conference, vol. 4, pp. 317-327, XP002532238, USENIX Assoc, Atlanta, Georgia.
Sheth et al., "Data structure distribution and multi-threading of Linux file system for multiprocessors", 5th International Conference on High Performance Computing, 1998 (HIPC '98); Madras, India Dec. 17-20, 1998, IEEE Comput. Soc, US, Dec. 17, 1998, pp. 97-104, XP010317644, DOI: DOI:10.1109/HIPC.1998.737976.
US Notice of Allowance dated Jul. 6, 2011 issued in U.S. Appl. No. 11/241,554.
US Office Action dated Jul. 8, 2011 issued in U.S. Appl. No. 11/478,998.
US Notice of Allowance dated Oct. 28, 2011 issued in 11/241,554.
US Office Action Final dated Jul. 29, 2011 issued in 11/395,118.
US Notice of Allowance dated Oct. 19, 2011 issued in 11/395,118.
US Notice of Allowance dated Sep. 30, 2011 issued in 12/019,582.
European Summons to attend oral proceedings dated Oct. 6, 2011 issued in EP Patent Application No. 04 750 678.7-1245.
European Extended Search Report, supplementary European Search Report, and European Search Opinion dated Jul. 26, 2011 issued in EP 05 802 942.2.
Japanese Office Action (Notice of Grounds for Rejection) dated May 10, 2011 issued in JP 2007-534880.
Katsurashima et al. (2003) "Design and Evaluation of CIFS Server Virtualization Method", *Technical Research Report (IEICE), The Institute of Electronics Information and Communication Engineers*, 103(248): 73-78.

* cited by examiner

ACCUMULATING ACCESS FREQUENCY AND FILE ATTRIBUTES FOR SUPPORTING POLICY BASED STORAGE MANAGEMENT

CROSS-REFERENCE TO RELATED APPLICATIONS

This application claims priority under 35 U.S.C. §119(e) to U.S. Provisional Patent Application No. 60/722,465, filed on Sep. 30, 2005, entitled "AN ACCESS FREQUENCY/FILE ATTRIBUTES ACCUMULATOR FOR SUPPORTING POLICY BASED STORAGE MANAGEMENT," by Wong et al.; this application claims priority under 35 U.S.C. §120 as a continuation-in-part to U.S. patent application Ser. No. 11/241,554, filed on Sep. 30, 2005, entitled "STORAGE POLICY MONITORING FOR A STORAGE NETWORK," by Wong et al.; and this application is related to U.S. patent application Ser. No. 10/831,376, filed on Apr. 23, 2004, entitled "TRANSPARENT FILE MIGRATION USING NAMESPACE REPLICATION," by Thomas K. Wong et al., and to U.S. patent application Ser. No. 10/831,701, filed on Apr. 23, 2004 entitled "TRANSPARENT FILE REPLICATION USING NAMESPACE REPLICATION," by Thomas K. Wong et al., each of which applications are herein incorporated by reference in their entirety.

BACKGROUND OF THE INVENTION

1. Field of the Invention

This invention relates generally to storage networks and, more specifically, to performing policy-based storage management using data related to access frequency and file attribute accumulation.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between file servers on a SAN use proprietary protocols and thus are typically provided by a common vendor. As a result, NAS file servers are preferred when price and ease of use are major considerations. However, the benefits of NAS storage networks over SAN storage networks also have drawbacks.

One drawback with NAS file servers is that there is no centralized control. Accordingly, each client must maintain communication channels between each of the NFS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is swapped out for an identically configured back-up NAS file server.

A related drawback is that a client must be reconfigured each time a file is relocated within the storage network, such as during file migration or file replication. The client generates a NAS file handle that identifies a physical location of the directory or file object on the file server. To access the object, the client sends an object access request directly to the NAS file server. When the file is relocated to a different NAS file server, subsequent requests for access to the file require a new look-up to locate the file and generate a new NAS file handle.

An additional drawback is that NAS file servers can become consumed with handling I/O (Input/Output) requests associated with file manipulations and accesses. As a result, additional processing tasks such as queries can unduly burden the NAS file servers. The file server typically walks a tree-structured directory tree in search of information requested by the query, and if there is more than one file system, each file system is individually walked. Consequentially, the file server may either become less responsive to I/O requests or have high latency in responding to the query. In some contexts, high latency will make the results stale.

Furthermore, NAS file servers can become unorganized and inefficient by, for example, storing critical data with other non-critical data. For example, large multimedia collections of MP3s used for leisure by employees can increase latency time in receiving information more germane to the productivity of an enterprise such as financial records. In another example, rarely accessed files may be stored on a premium, high bandwidth file server while often accessed files may be stored on a commodity, lower bandwidth server.

Therefore, what is needed is a network device to provide selectively migrate objects between file servers on a storage network. Furthermore, there is a need for identifying files to be migrated without burdening the file servers in, for example, servicing I/O requests.

SUMMARY

A system and method for performing policy-based storage management using data related to access frequency and file attribute accumulation. In one embodiment, a switch device provides transparency for transactions between a client and a storage network. The transparency allows objects (e.g., files or directories) to be moved (e.g., migrated) on the storage network without affecting a reference to the object used by the client (e.g., a file handle). In one embodiment of the switch device, a monitoring module generates accumulation data associated with the transactions for use in policy-based management. The accumulation data can describe uses of the file such as how often certain files are accessed, modifications to files such as creations of new directories or files, and other uses.

One embodiment of the monitoring module comprises an I/O monitoring module to receive transaction requests processed by the switch device, and determine if the underlying transaction concerns a file system being monitored. A transaction categorization module can determine whether the transaction is a type being monitored, and if so, forward to an appropriate log in a transaction logs module for storage. The transaction log can be, for example, a cyclic buffer. An accumulator module processes logs on a periodic basis and stores its results in a records repository.

In another embodiment, a policy module manages the records repository in accordance with predetermined rules. For example, a network administrator can set the rules from a user interface. Also, the rules can be pre-loaded. The policy module can include a scheduling module to invoke the policy at certain intervals, a policy execution module to form queries from the rules, and a query module to manage the queries to the records repository. The queries can be, for example, SQL queries.

DETAILED DESCRIPTION OF THE INVENTION

A system and method for performing policy-based storage management using data related to access frequency and file attribute accumulation. A policy can include rules that establish which objects are migrated from a source file server to a destination file server. For example, large multimedia files that consume bandwidth on expensive or critical file servers, without adding much value to enterprise productivity, can be migrated to a commodity or less critical file server. In one embodiment, a NAS (Network Attached Storage) switch in the data path of a client and NAS file servers on the storage network, implements selective migration using file handles that are independent of locations on the storage network. Mapping between the file handles which are static and locations which can be dynamic, allows the client to access objects after migration using file handle that persists through the migration.

Figure 1:
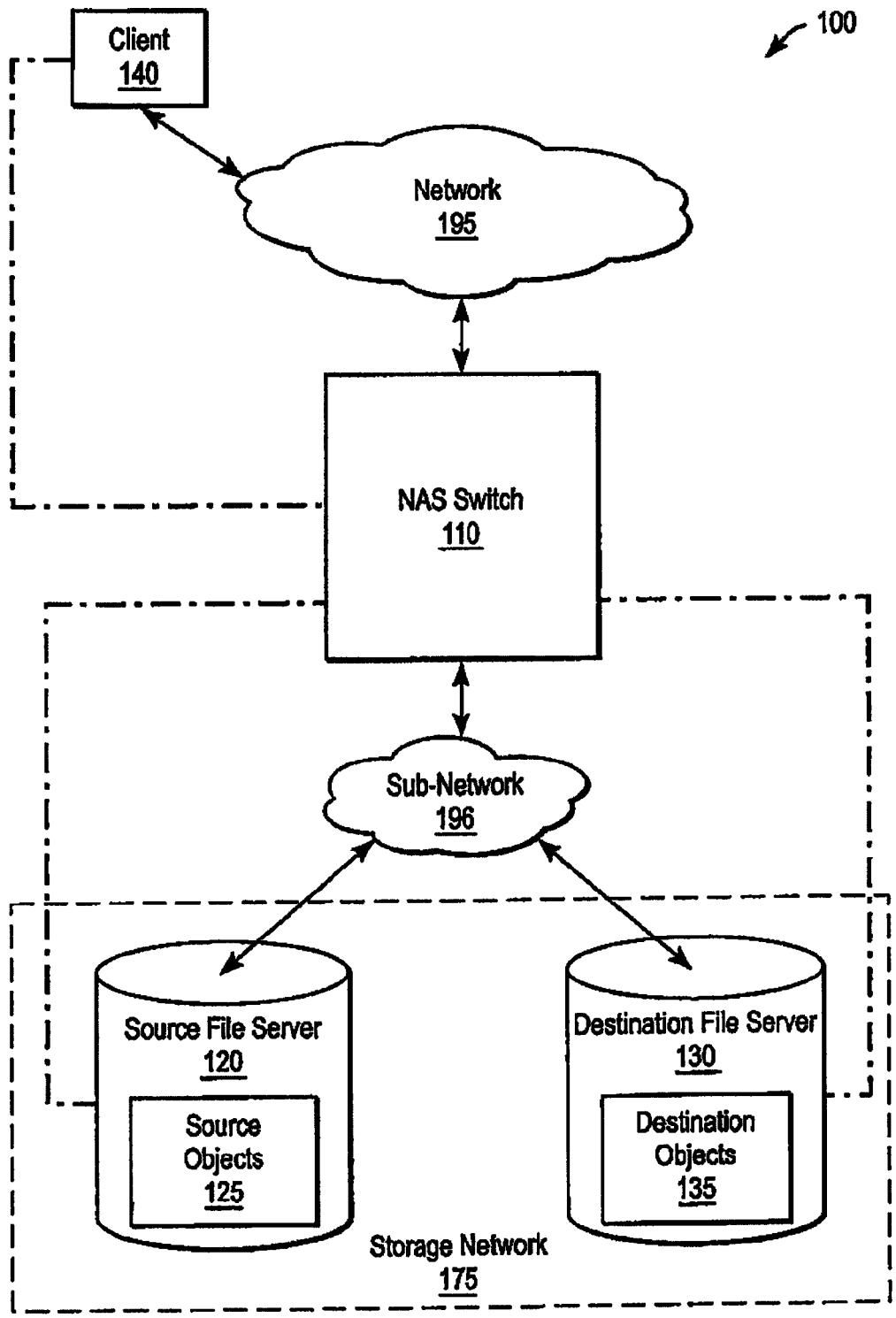
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 (or more generically, a switch device) and a client 140 coupled to a network 195. The NAS switch 110, a source file server 120, and a destination file server 130, are each coupled in communication through a sub-network 196. Note that there can be various configurations of the system 100, such as embodiments including additional clients 140, additional source and/or destination file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 selectively migrates objects from a location on the source file server 120 to a location on the destination file server 130. Selective migration can determine which objects to migrate based on file attributes such as file type, file size, file access frequency, other file conditions, schedules, and the like, as determined by a policy. The policy can include rules that delineate certain actions in accordance with certain file attributes or conditions. In one embodiment, the NAS switch 110 can perform a rehearsal that shows the effects of a policy in a report. The policy can be iteratively adjusted to reach desired results.

The NAS switch 110 provides continuous transparency to the client 140 with respect to object management. Specifically, the NAS switch 110 can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the source file server 120 to appropriate locations on the destination file server 130. Thus, the client 140 submits object requests, such as file writes and directory reads, directly to the NAS switch 110. Likewise, the file servers 120, 130 are unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 receives exported file system directories from the file servers 120, 130 containing NAS switch handles. To create compatibility between the client 140 and the NAS switch 110, the NAS switch 110 maps the file system directories to internal switch file systems which it sends to the client 140. To request an object, the client 140 traverses an exported switch file system and selects a switch file handle which it sends to the NAS switch 110 along with a requested operation.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. The process of obtaining a file handle from a file name is called a look-up. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the source file server 120. This enables the NAS switch 110 in mapping persistent file handles to a choice of alternative NAS file handles. An original NAS file handle refers to an initial object location on the source file server 120. A stored NAS file handle refers to a NAS file handle, stored as an object on the file servers 120, 130, which points to an alternative file location.

Object transaction requests handled by the NAS switch 110 include, for example, directory and/or file reads, writes, creation, deletion, moving, and copying. A namespace access refers to an operation accessing or modifying the namespace such as look-up, rename, delete, or create. A file access refers to an operation accessing or modifying files such as read or write. An object can refer to a directory object or a file object. Directory objects can further comprise sub-directories and file objects within directory. As used herein, various terms are used synonymously to refer to a location of an object prior to migration (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

In one embodiment, the NAS switch 110 can be configured to monitor the transaction requests to accumulate frequency and file attribute information as described in more detail below. The accumulated information can be used for various applications allowing policy enforcement. One type of policy enforced on the storage network 175 can be selective migration. For example, a selective migration application can optimize the storage network 175 by moving more frequently used files to high performance servers, and by moving less frequently used files to commodity servers. Another type of policy enforcement can be file clean up. For example, all non-essential files older than 2 year are deleted. Many other implementation-specific policies are possible given the disclosure herein.

The NAS switch 110 can be configured for other types of applications such as indexing and categorization. An indexing application can build an index database for fast content-based searching. Recent transactions which modify the storage network 175 can be recorded for updating the index database without the need for walking the file systems. A categorization application can maintain statistics on the types of files being stored. The list allows files of the same type to be quickly identified without walking the file systems. As a result, in one example, non-essential files such as MP3s can be quickly identified and migrated to commodity servers.

In a typical transaction, the client 140 accesses resources on the file servers 120, 130 by submitting a switch file handle to the NAS switch 110, intended for the source file server 120. To find the switch handle, the client 140 first mounts an exported switch file system containing switch file handles. The client 140 looks-up an object to obtain its file handle and submits an associated request. From the perspective of the client 140, transactions are carried out by the file servers 120, 130 having object locations that do not change. Thus, the client 140 interacts with the NAS switch 110 before and after a file replication in the same manner. A user of the client 140 can submit operations through a command line interface, a windows environment, a software application, or otherwise. In one embodiment, the NAS switch 110 further provides access to a storage network 175 other than a NAS storage network.

The source file server 120 is the default or original network file server for the client 140 before file migration. The source file server 120 further comprises source objects 125, which include namespace directories and files such as enterprise data, records, database information, applications, and the like. The source file server 120 can store a table of migrated directories maintained by the NAS switch 110 that correlate results from namespace migration. Moreover, the source file server 120 can store a file handle migration table, maintained by the NAS switch 110, denoting each migrated directory and file object. The source file server 120 comprises, for example, a personal computer using an x86-type processor with an operating system and/or an application, a workstation, a specialized NAS device with an optimized operating system and/or application, a modified server blade, etc.

The destination file server 130 becomes the primary network file server used by the NAS switch 110 after file migration. The destination file server 130 further comprises destination objects 135, which include the replicated namespace directories and source files. The destination file server 130 can comprise the same hardware and/or software as described with reference to the source file server 120. The source and destination file servers 120, 130 are preferably NAS file server, but can also be file servers using other decentralized protocols that do not inherently support file migration. Further embodiments of the source and destination file servers 120, 130 and related methods are described below.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The sub-network 196 is preferably a local area network providing optimal response time to the NAS switch 110. In one embodiment, the sub-network 196 is integrated into the network 195.

Figure 2:
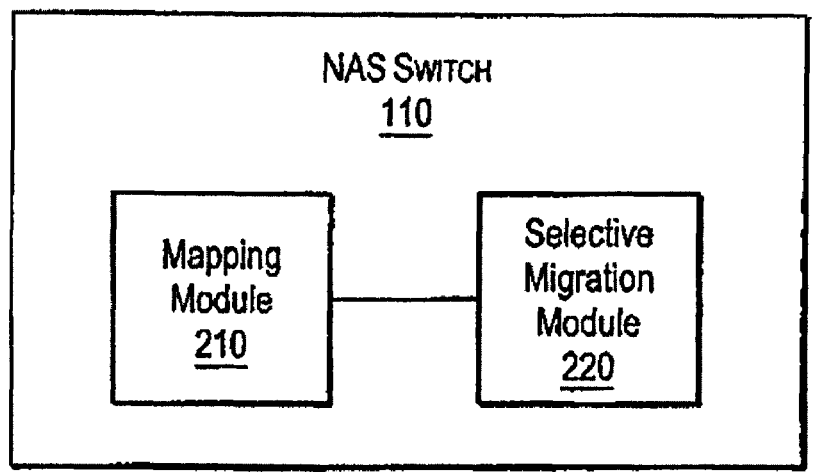
FIG. 2 is a block diagram illustrating the NAS switch according to one embodiment of the present invention.

FIG. 2 is a block diagram illustrating the NAS switch 110 according to one embodiment of the present invention. The NAS switch 110 comprises a mapping module 210 and a selective migration module 220. Generally, the mapping module 210 handles file handles I/O transactions associated with objects, and sends information about successful I/O transactions to the selective migration module 220 for tracking updates to since the last walk of the tree-structured file servers. Note that modules are merely exemplary groupings of functionality.

Prior to file migration, the mapping module 210 receives a switch file handle with a request from the client 140 which it uses to find an original NAS file handle. The mapping module 210 submits the original NAS file handle with the request to the source file server 120. If the object has yet to change locations in the storage network 175, the mapping module 210 uses the original NAS file handle. The mapping module 210 can submit the switch file handle to the migration module 220 to determine if the object is part of a data migration. Also, the file server interface 220 can submit the switch file handle to the redirection module 230 to determine if the object has completed data migration. In either case, an appropriate NAS file handle is returned for the mapping module 210 to use in forwarding the client request to the appropriate file server 120, 130

After file migration, the mapping module 210 looks-up switch file handles received from the client 140 in the file handle migration table. If an object has been migrated, the redirection module outputs a destination NAS file handle corresponding to a location on the destination file server 130.

The selective migration module 220 receives information about successfully I/O transactions from the mapping module 210. In other embodiments, the selective migration module 220 can intercept transactions headed for the mapping module 210 before processing, or receive a duplicate of transactions sent to the mapping module 210. Upon executing a policy to migrate objects, the selective migration module 220 can update file locations in the mapping module 210.

Figure 3:
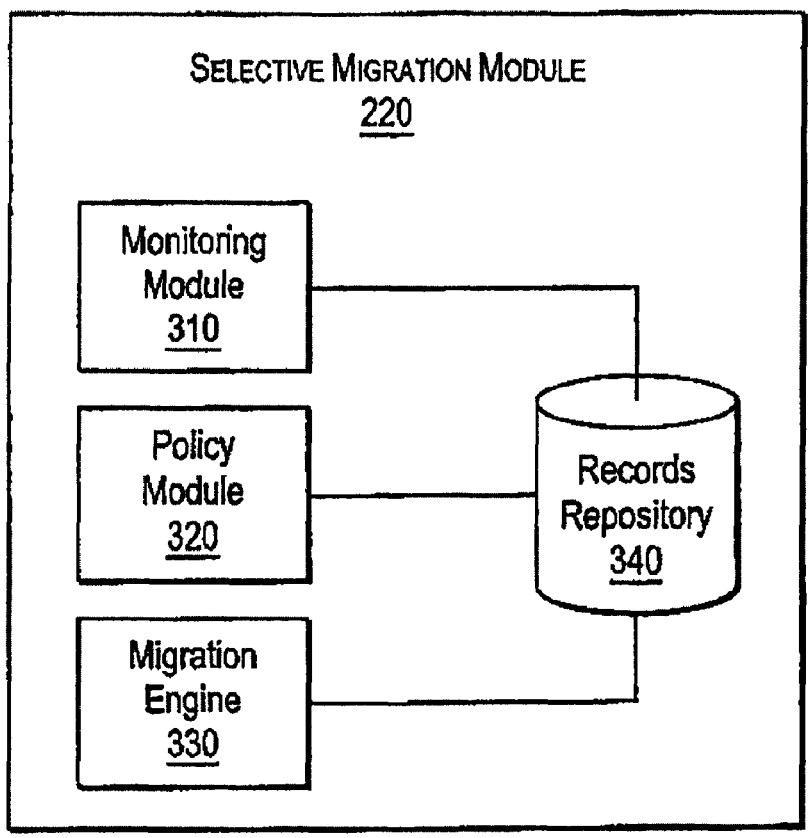
FIG. 3 is a block diagram illustrating a selective migration module according to one embodiment of the present invention.

FIG. 3 is a block diagram illustrating a selective migration module 220 according to one embodiment of the present invention. The selective migration module 220 comprises a monitoring module 310, a policy module 320, a migration engine 330, and a records repository 340. Generally, the records repository is populated using a traversal (walk) of tree-structured directories or shares, and records are updated with information about transactions with objects in the directories. The policy module 320 can perform policy-based migration through query or sorting interactions with the records repository 340.

Figure 8:
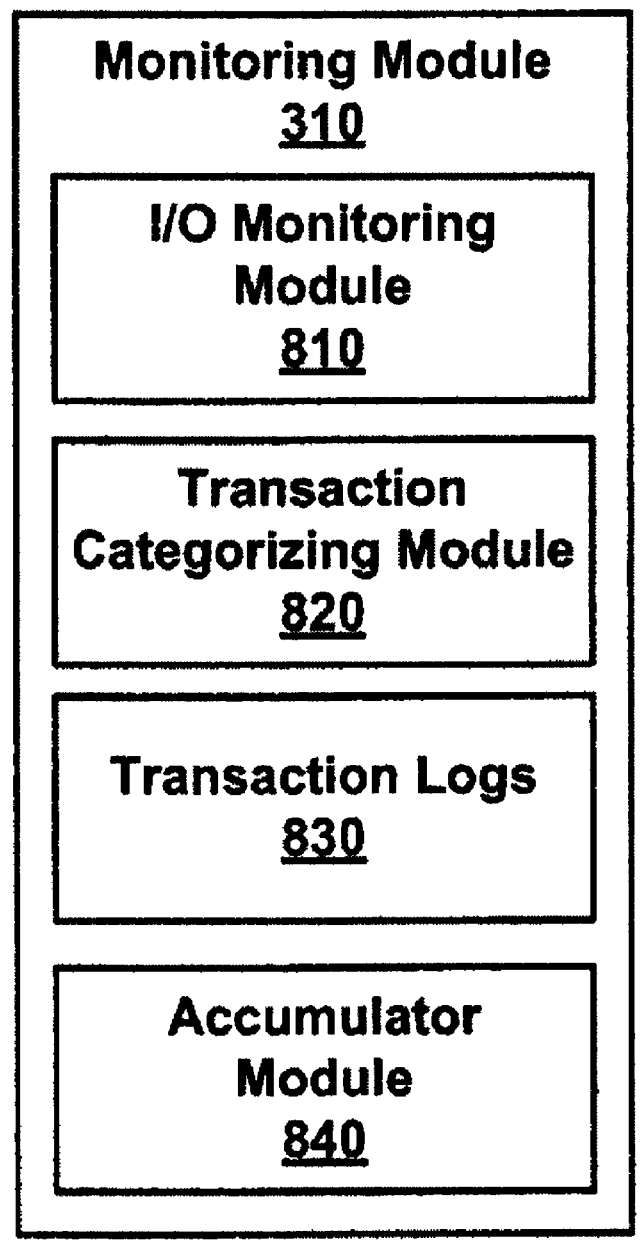
FIG. 8 is a block diagram illustrating a monitoring module according to one embodiment of the present invention.

The monitoring module 310, as shown in more detail with respect to FIG. 8, comprises an I/O monitoring module 810, a transaction categorizing module 820, transaction logs 830, and an accumulator module 840. Generally, the monitoring module 310 receives information relating to successful I/O transactions involving objects, and sends processed information to the records repository 340 for storage. More specifically, the I/O monitoring module 810 determines whether the transaction is associated with a file system being monitored. The transaction categorizing module 820 receives transactions from the I/O monitoring module 810 to determine whether the transaction is a type of transaction being monitored. The transaction logs 830 stored monitored transactions as transaction records. At certain intervals, the accumulator module 840 processes transaction records for storage in the records repository 340.

Figure 9:
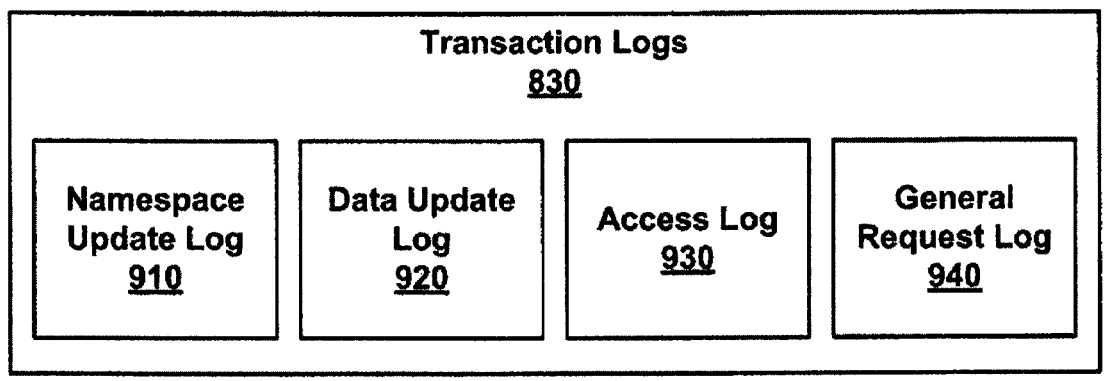
FIG. 9 is a block diagram illustrating transaction logs according to one embodiment of the present invention.

An embodiment of the transaction logs 830 is shown in FIG. 9. The transaction logs 830 comprise records for specific requests: a namespace update log 910, a data update log 920, and an access log 930; and records for general requests in a general request log 940. The logs 910-940 can be part of a memory device such as a RAM (random access memory) device or other type of memory element. The logs 910-940 can operate as cyclic buffers such as a FIFO (first in first out) type of buffer that replaces the oldest record with the newest record.

Figure 10:
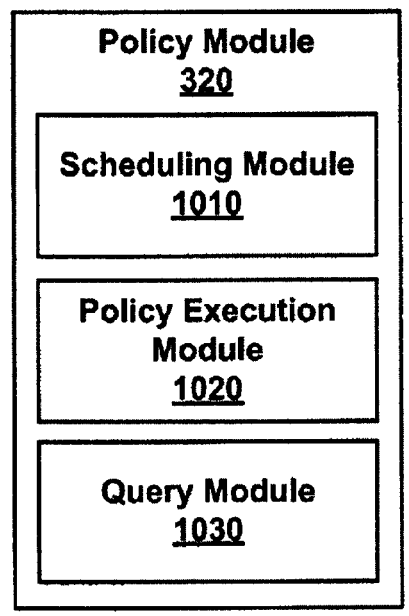
FIG. 10 is a block diagram illustrating a policy module according to one embodiment of the present invention.

The policy module 320, as shown in more detail in FIG. 10, comprises a scheduling module 1010, a policy execution module 1020, and a query module 1030. In one embodiment, the scheduling module 1010 initiates a process at intervals (e.g., as programmed by a system administrator). The policy execution module 1020 accesses rules that form a policy, and feeds specific commands to the query engine 800. The rules can depend upon the application. The rules can be preconfigured or created by a network administrator. The rules can be Boolean combinations of conditions. For example, FILE TYPE IS MPEG and FILE SIZE IS MORE THAN 100 MEGABYTES. The query module 1030 manages the application of specific commands for application against data stored in the records repository 340 (e.g., accumulation and frequency data).

The migration engine 330 can migrate file identified by the policy module 320. For example, each of the files that have not been accessed in the last year can be moved to a dedicated filer server for rarely accessed files. In one embodiment, the migration engine 320 migrates the namespace associated with each object prior to migrating data associated with each object.

The records repository 340 can store records associated with objects in the tree-structured directories by traversing the tree-structured directories. In response to receiving logs from the monitoring module 310, the records repository 340 can update records. Periodically, the records repository 340 can synch with the directories with traversals.

Figure 6:
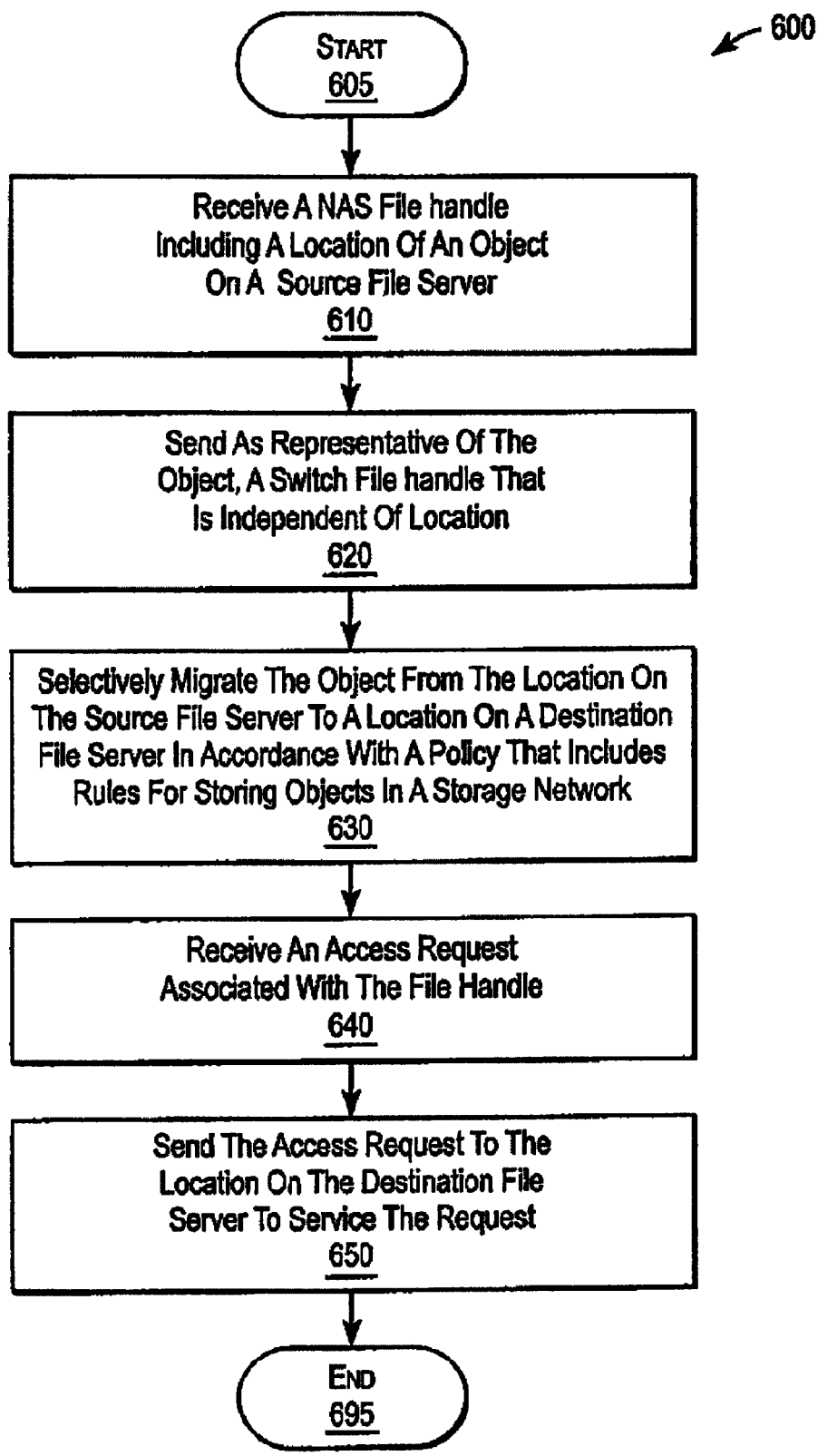
FIG. 6 is a flow chart illustrating a method for providing selective migration in accordance with a policy according to one embodiment of the present invention.

FIG. 6 is a flow chart illustrating a method 600 for providing selective migration in accordance with a policy according to one embodiment of the present invention. A NAS file handle including a location of the object on a source file server is received 610. A switch file handle that is independent of the location of the object is sent as representative of the object 620. The object is selectively migrated 630 from the location on the source file server to a location on a destination file server in accordance with a policy that includes rules for storing objects in the storage network. An access request associated with the switch file handle is received 640. The access request is sent 650 to the location on the destination file server.

The information can be recorded one or more logs, as discussed below with respect to FIG. 9. For example, an access log can be updated each time a file or directory is read. Logs can be maintained based on the importance of tracked transactions. For example, while all file or directory creations are tracked, in one embodiment, only the last file modification is tracked. In another optimization, an access log can count accesses over an hour without recording the time of each access. The monitoring module 310 periodically sends the logs to the records repository 340 for processing (e.g., once an hour).

The policy module 320 can implement rules with searches on the records repository 340 to identify files meeting the conditions. In one embodiment, a user interface (e.g., viewed in a web browser) can allow a network administrator to configure rules. The policy module 320 can be triggered periodically on a per-policy basis such as once a day or once a week.

Figure 7:
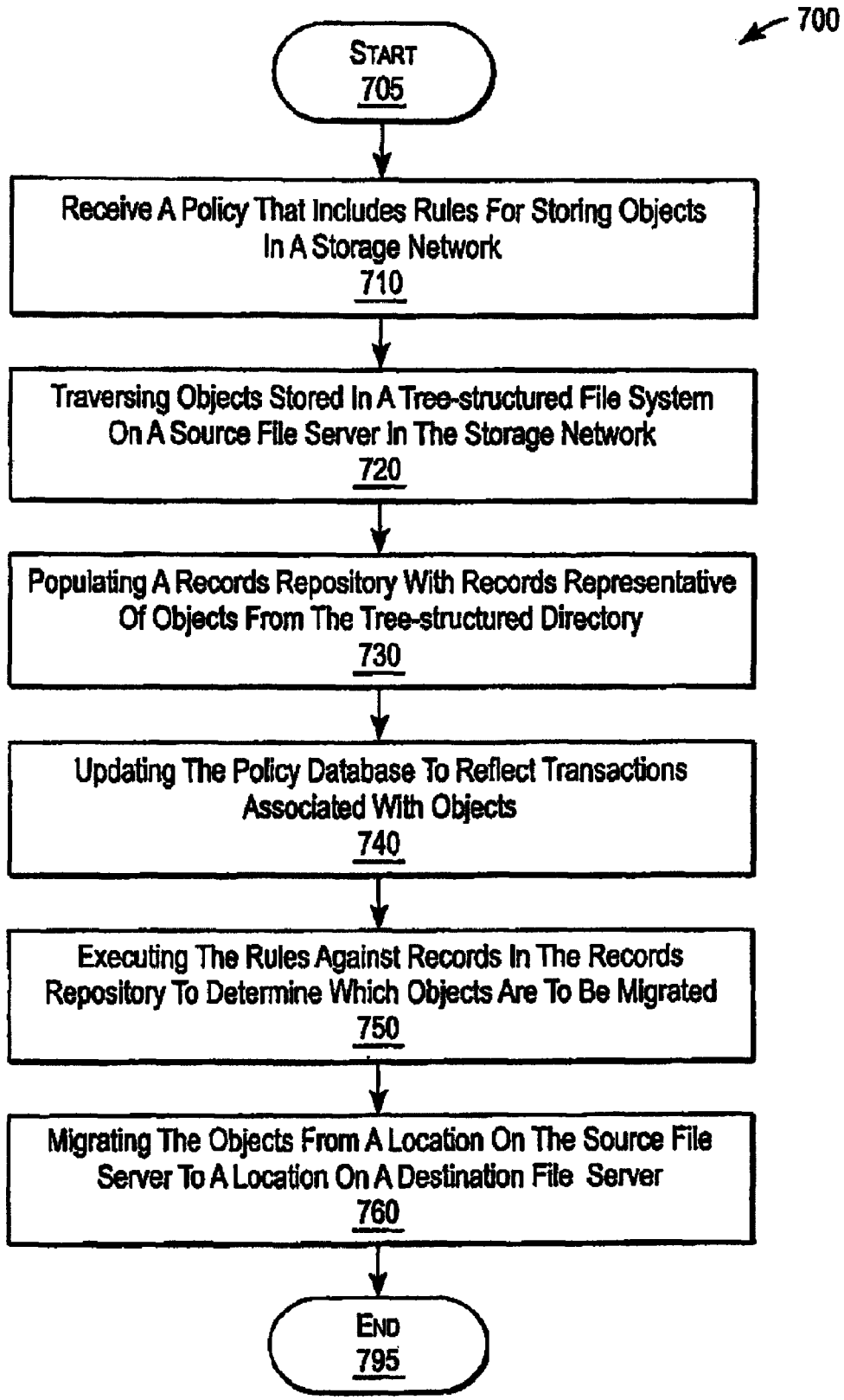
FIG. 7 is a flow chart illustrating a method for providing selective migration in accordance with a policy according to another embodiment of the present invention.

FIG. 7 is a flow chart illustrating a method 700 for providing selective migration in accordance with a policy according to another embodiment of the present invention. A policy that includes rules for storing objects in the storage network is received 710. Objects stored in a tree-structure on a source file server in the storage network are traversed 720. A policy database (or records repository) is populated 730 with records representative of the tree-structure. The policy database is updated 740 to reflect transactions associated with the objects. The rules are executed 750 against records in the policy database to determine which objects are to be migrated, as described below with respect to FIG. 12. The objects are migrated 760 from a location on the source file server to a location on a destination file server.

Figure 4:
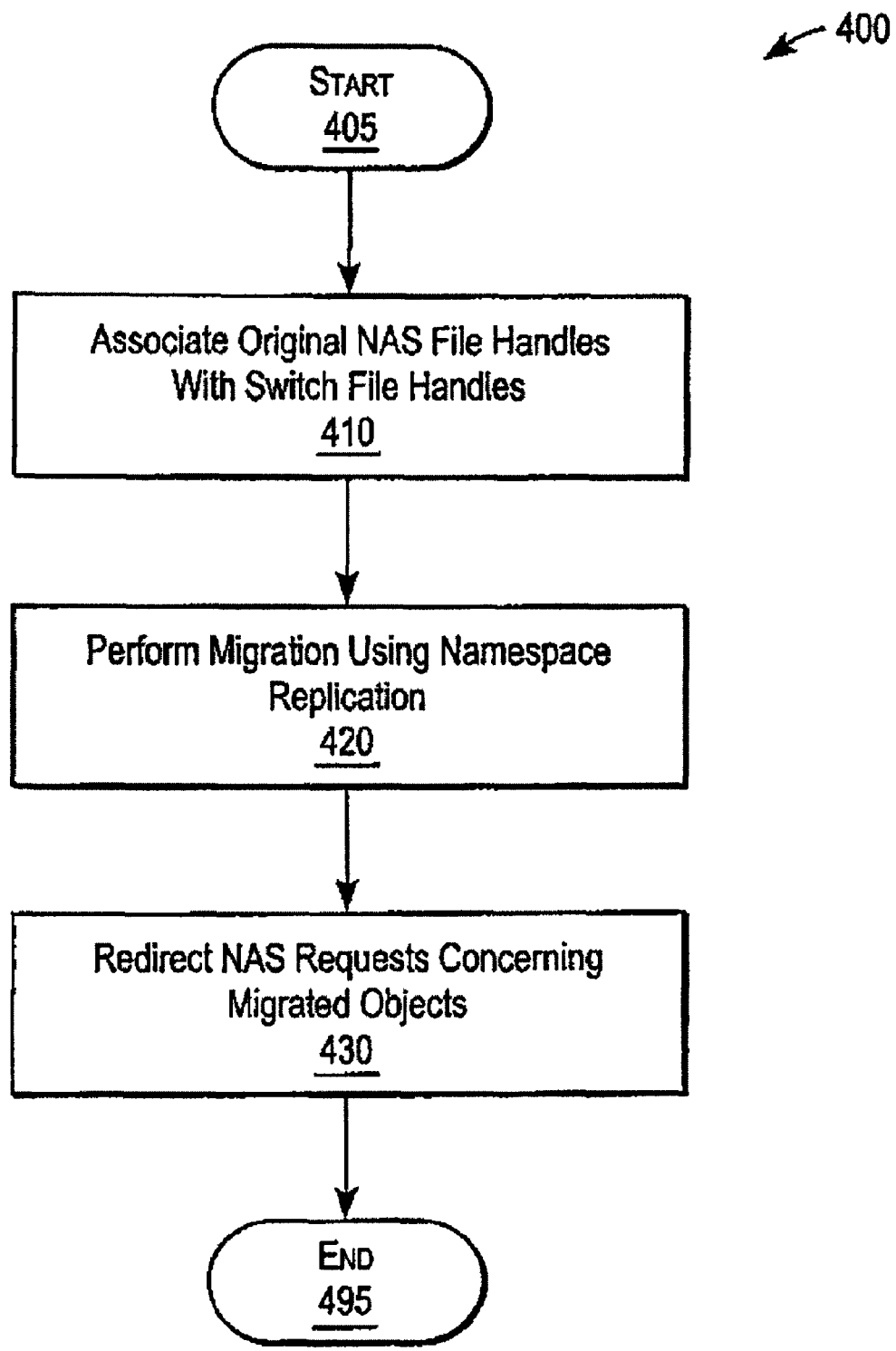
FIG. 4 is a high-level flow chart illustrating a method for providing transparent file migration in a NAS storage network according to one embodiment of the present invention.
Figure 5:
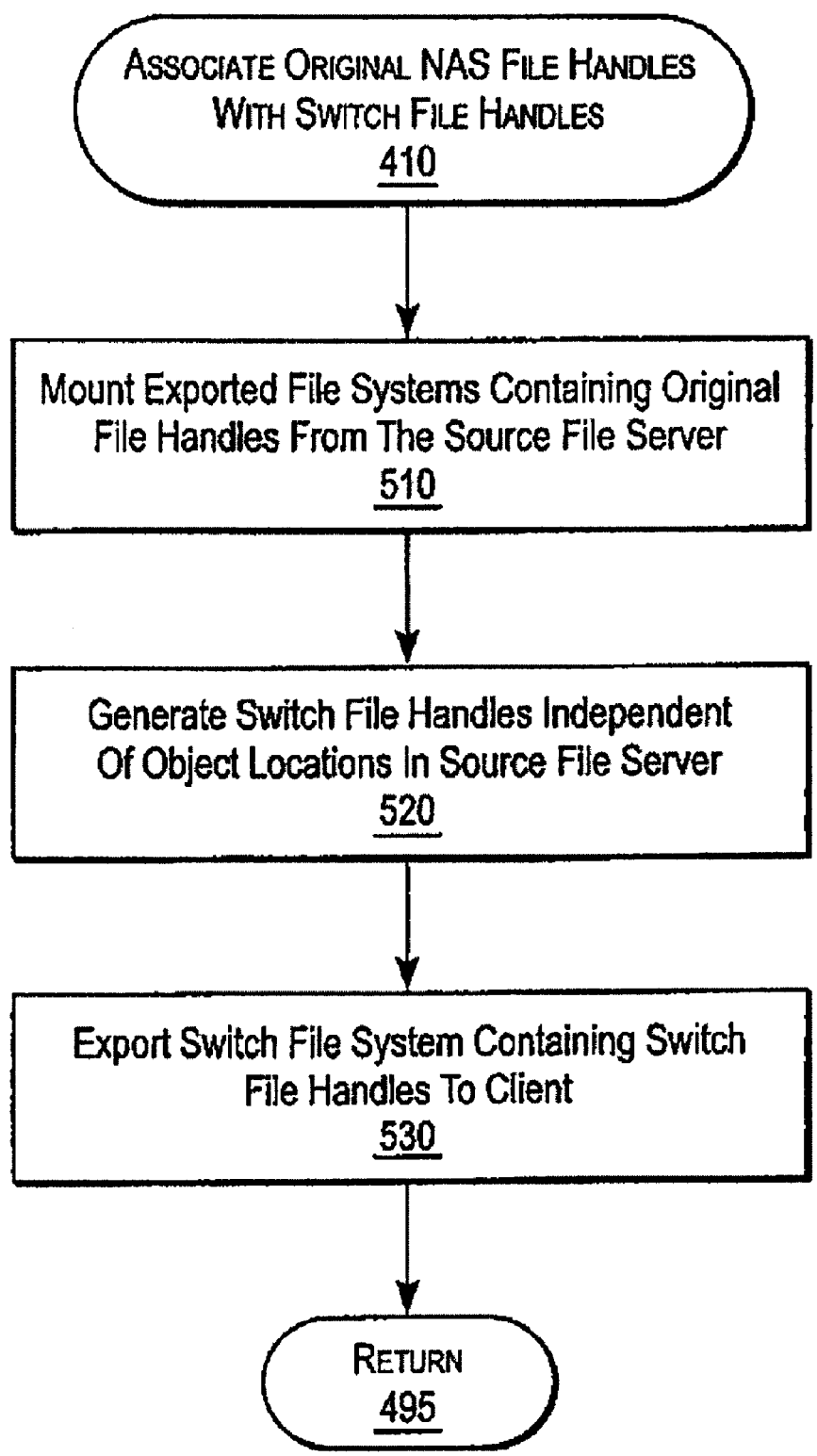
FIG. 5 is a flow chart illustrating a method of associating original NAS file handles with switch file handles according to one embodiment of the present invention.

FIG. 4 is a flow chart illustrating a method 400 for migrating objects according to one embodiment of the present invention. Prior to migration, the NAS switch 110 associates 410 original NAS file handles with switch file handles 175. As detailed in FIG. 5, the exported file system 510 containing the original file handles is mounted from the source file server. The switch file handle is generated 520 independent of object locations. The switch file system containing the switch file handles is then exported 50 to the client 140. Referring again to FIG. 4, migration from the source file server 110 to the destination file server 120 is performed 420 using namespace replication. After migration, NAS requests (i.e., transaction requests) are redirected by the mapping module 210 according to the new locations. The method 400 is described in further detail in U.S. Pat. No. [attorney to insert migration patent no.].

Figure 11:
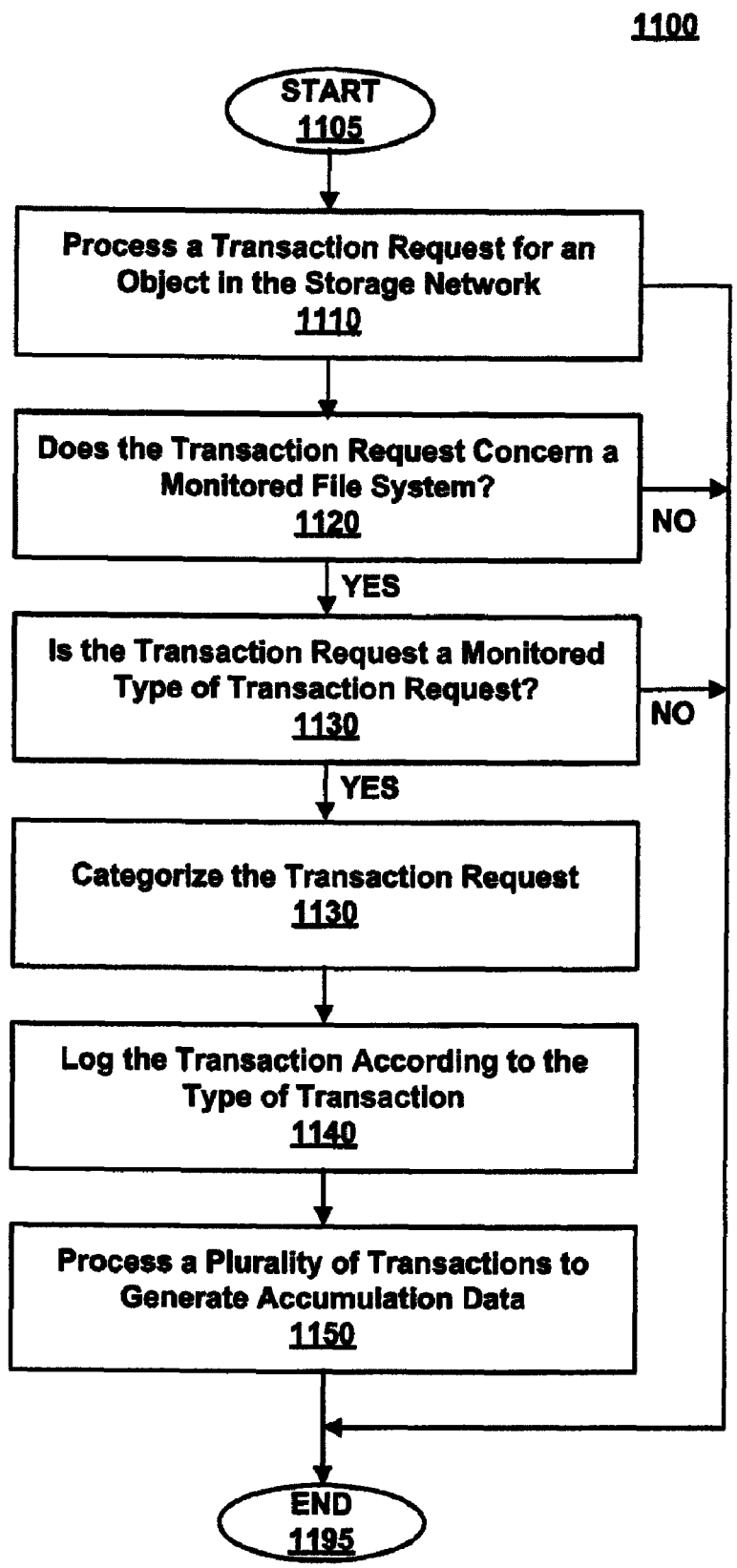
FIG. 11 is a flow chart illustrating a method for logging transactions according to one embodiment of the present invention.

FIG. 11 is a flow chart illustrating a method 1100 for generating accumulation data according to one embodiment of the present invention. The mapping module 210 of the NAS switch 110 processes 1110 a transaction request for an object in the storage network 175. In one embodiment, once the transaction request is serviced and a response is being sent back to the client 140, a copy of the transaction request is sent to the monitoring module 310. The NAS switch 110 may service the transaction request prior to copying to ensure its validity. For example, if a file is requested that does not exist, the transaction request would lead to invalid accumulation data.

Once received, the I/O monitoring module 810 determines 1120 whether the transaction request concerns a monitored file system. A network administrator can use an interface to select which file systems are monitored. If the file system has not been selected, no further processing is necessary. The transaction categorizing module 820 determines 1130 whether the transaction request is a type of transaction being monitored. Monitored transactions can include, for example, FDNOPS, FDAOPS, or FDUOPS. More specifically, FDNOPS include updates to a namespace of a file system such as create, rename, delete, create directory, rename directory, or remove directory. FDAOPS include updates to data in a file system such as a write operations, or a change or set file size operation. FDUOPS include accesses to a file system such as a read operation. Some embodiments include additional types of operations such as open or close operations.

The transaction logs 830 log 1140 the transaction request according to its type. For example, the transaction categorization module 820 can set a code for the type of transaction which directs it to a specific log. In one embodiment, FDNOPS are stored in the namespace update log 910, FDUOPS are stored in the data update log 920, FDAOPS are stored in the access log 920, and others are stored in the general request log 940.

At certain intervals (e.g., when a cyclic buffer storing a log is full), the accumulator module 840 processes 1150 a plurality of transactions to generate accumulation data. A directory table stores records relating to the directories, a file table stores records relating to the files, and an hourly frequency table stores data related to frequency. In one embodiment, processing the namespace update log 910 includes creating a new record in the file table for a file create operation, changing a file name field in the file table for a file rename operations, a removing a record in the file table for a file delete operation. Similar processing can be performed on records in the directory table for directory operations.

In one embodiment, processing the data update log 920 includes determining if the next record has a matching file system ID, path name, and file name, and if so, no further processing is necessary. Otherwise, or if this is the last transaction record, a last write time is updated in a record having a matching system ID, pathname, and file name.

Processing the access log 930 includes creating a record in an hourly frequency table for each transaction record. If successful, a value in a count field is set to 1 and a value in a bytes read field is set to a value of a bytes read field in the transaction record. A new record is not created if one already exists. Instead, the existing record is retrieved and the value in the count field is incremented by 1. Additionally, the value in the bytes read field is incremented by the value of the bytes read field in the transaction record. The record is written back to the hourly frequency table.

Figure 12:
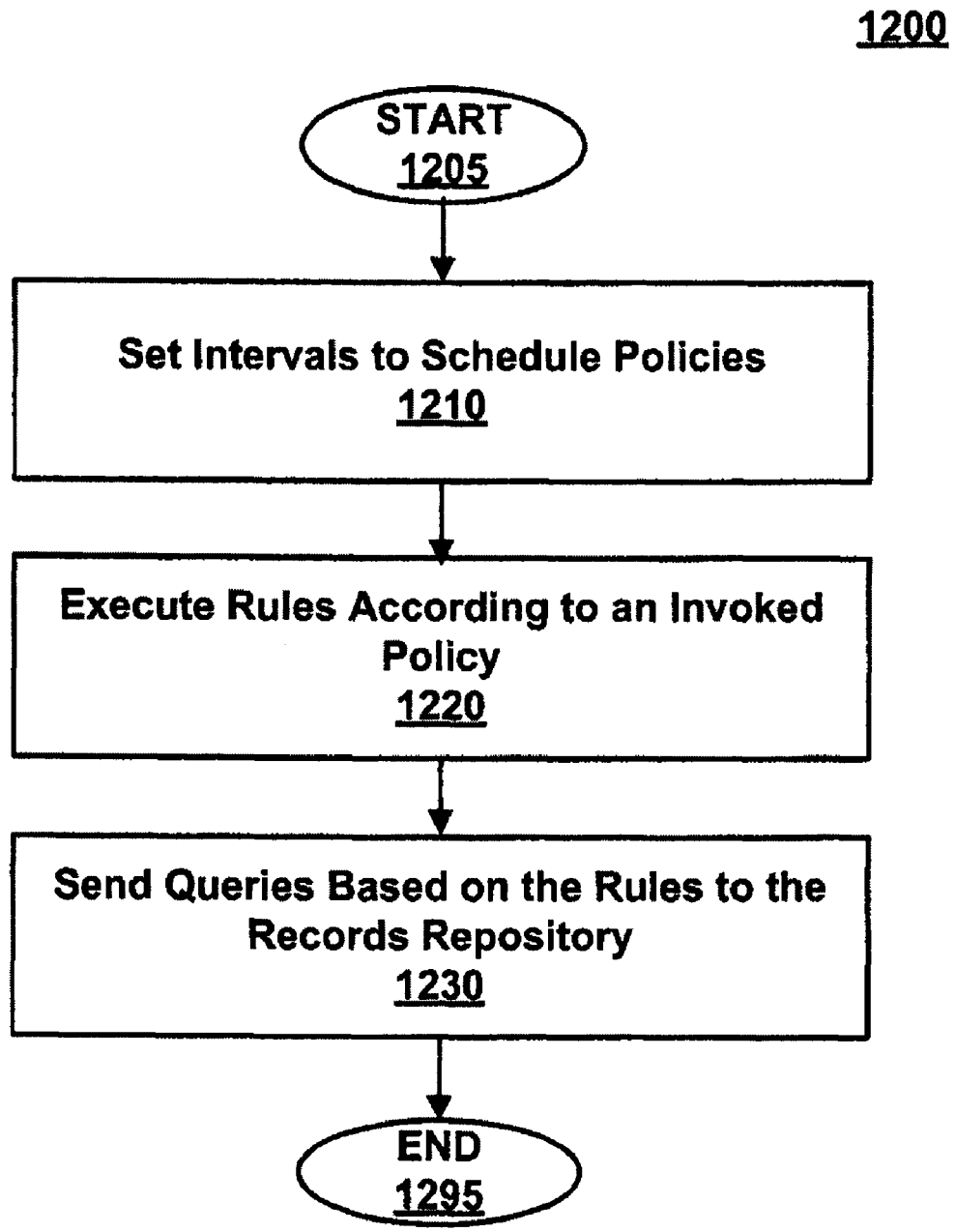
FIG. 12 is a flow chart illustrating a method for applying a policy to logged transactions according to one embodiment of the present invention.

FIG. 12 is a flow chart illustrating a method 1200 for applying a policy according to one embodiment of the present invention. The scheduling module 1010 of the policy module 320 can set 1210 intervals to schedule invocation of the policy. One or more policies can be scheduled for execution concurrently, or at different times. The policy execution module 1020 executes 1220 rules according to the policy. The policy can be a list of fields and values used to set parameters. For example, in a selective migration policy, files that have not been modified or accessed in the last week can be moved to a different server. Many other policies are possible. The query module 1030 sends 1230 queries, based on the rules, to the records repository 340. The queries can be formed using, for example, SQL commands. In the selected migration example, a list of records can be sent back to the policy execution module 1020 which in turn, sends the list to the migration engine 330 for migration.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

We claim:

1. A method for monitoring transactions related to objects in a storage network, comprising:

at a switch device coupled between a client and a storage network, identifying which one or more file systems on the storage network to monitor and which one or more types of transaction requests to monitor;

periodically receiving a plurality of received transaction requests each concerning an object in the storage network, the switch device configured to process transaction requests sent by the client;

for each received transaction request, determining that the received transaction request is directed to a file system on the storage network that has been identified as being monitored and that a type of the received transaction request has been identified as being monitored and based on such determination, logging the received transaction request according to the type of the received transaction request;

periodically processing a plurality of such logged transaction requests to generate accumulation data associated with objects to which the logged transaction requests are directed, the accumulation data describing an access, modification or other use of each object;

storing the accumulation data in a records repository;

applying a storage network management policy to the objects based on the accumulation data, wherein applying the policy comprises directing queries based on the policy to the records repository;

wherein the switch device provides a switch file handle to the client for each object, said switch file handle identifying the object independent of physical location, and the switch device maps the switch file handle to a storage network file handle, the storage network file handle identifying the physical location of the object in the storage network, and wherein each received transaction request sent by the client comprises a selected one of the switch file handles for the object of the received transaction request.

2. The method of claim 1, further comprising:

categorizing each received transaction request; and logging each received transaction request according to the categorization.

3. The method of claim 1, wherein periodically processing the logged transaction requests comprises: incrementing a count associated with a record for each logged transaction request concerning the record.

4. The method of claim 1, wherein periodically processing the logged transaction requests comprises: incrementing a type count associated with a record for each type of logged transaction request concerning the record.

5. The method of claim 1, wherein periodically processing the logged transaction requests comprises: incrementing a number of bytes to reflect a total number of bytes for each logged transaction request concerning an object.

6. The method of claim 1, wherein applying the policy comprises: mapping rules of the policy to commands; and querying the objects according to the commands.

7. The method of claim 1, wherein logging the each received transaction request comprises logging the received transaction request in a cyclic buffer, and wherein periodically processing the logged transaction requests comprises periodically processing the logged transaction requests responsive to the cyclic buffer completing cycle.

8. The method of claim 1, wherein each received transaction request comprises a Network Attached Storage (NAS) file handle.

9. The method of claim 1, wherein each received transaction request comprises an update to a namespace of a file system on the storage network.

10. The method of claim 1, wherein each received transaction request comprises an update to data of a file on the storage network.

11. The method of claim 1, wherein each received transaction request comprises an access to one of a directory or file on the storage network.

12. The method of claim 1, further comprising: processing each logged transaction request by sending a command to the storage network and forwarding results of the command to the client.

13. A switch device coupled between a client and a storage network to process transaction requests submitted by the client, comprising a processor configured to include or execute a file handle module to provide a plurality of switch file handles to the client, each switch file handle identifying an object independent of physical location, where the object is physically located in a storage network;

a mapping module to map each switch file handle to a storage network file handle, each storage network file handle identifying the physical location of the object of the storage network file handle in the storage network;

an I/O monitoring module to receive a plurality of transaction requests from the client, each transaction request concerning a one of the objects in the storage network, and determine whether each transaction request is directed to a file system on the storage monitor that has been identified as being monitored, wherein each transaction request comprises a one of the switch file handles;

a transaction categorizing module to determine whether each transaction request is a type of transaction request that has been identified as being monitored;

transaction logs to log each transaction request according to the type of transaction request after a determination has been made that the transaction request is of a type that has been identified as being monitored;

an accumulator module to periodically process a plurality of such logged transaction requests to generate accumulation data associated with objects to which the logged transaction requests are directed, the accumulation data describing an access, modification or other use of each object;

storing the accumulation data in a records repository; and a policy module to apply a storage network management policy to the objects based on the accumulation data, wherein applying the policy comprises directing queries based on the policy to the records repository.

14. The switch device of claim 13, wherein the category transaction module categorizes each received transaction request, and the transaction logs log each received transaction request to the categorization.

15. The switch device of claim 13, wherein the accumulator module increments a count associated with a record for each logged transaction request concerning the record.

16. The switch device of claim 13, wherein the accumulator module increments a type count associated with a record for each type of logged transaction request concerning the record.

17. The switch device of claim 13, wherein the accumulator module periodically increments a number of bytes to reflect a total number of bytes for each logged transaction request concerning an object.

18. The switch device of claim 13, further comprising a policy module to map rules of the policy to commands, and query the objects according to the commands.

19. The switch device of claim 13, wherein the transaction logs store the received transaction request in a cyclic buffer, and wherein the accumulator module periodically processing the logged transaction requests responsive to the cyclic buffer completing cycle.

20. The switch device of claim 13, wherein each received transaction request comprises a Network Attached Storage (NAS) file handle.

21. The switch device of claim 13, wherein each received transaction request comprises an update to a namespace of a file system on the storage network.

22. The switch device of claim 13, wherein each received transaction request comprises an update to data of a file on the storage network.

23. The switch device of claim 13, wherein each received transaction request comprises an access to one of a directory or file on the storage network.

24. The switch device of claim 13, further comprising a mapping module to process each logged transaction request by sending a command to the storage network and forwarding results of the command to the client.

25. An apparatus for monitoring transactions related to objects in a storage network, comprising:
- means for identifying which one or more file systems on the storage network to monitor and which one or more types of transaction requests to monitor;
- means for periodically receiving a plurality of received transaction requests each concerning an object in the storage network, the switch device configured to process transaction requests sent by a client;
- means for determining for each received transaction request that the received transaction request is directed to a file system on the storage network that has been identified as being monitored and that a type of the received transaction request has been identified as being monitored and a means for logging the received transaction request according to the type of the received transaction request based on such determination;
- means for periodically processing a plurality of such logged transaction requests to generate accumulation data associated with objects to which the logged transaction requests are directed, the accumulation data describing an access, modification or other use of each object;
- means for storing the accumulation data in a records repository; means for applying a storage network management policy to the objects based on the accumulation data, wherein applying the policy comprises directing queries based on the policy to the records repository; and
- means for providing a switch file handle to the client for each object, said switch file handle identifying the object independent of physical location, and mapping the switch file handle to a storage network file handle, the storage network file handle identifying the physical location of the object in the storage network,
- wherein each received transaction request sent by the client comprises a selected one of the switch file handles for the object of the received transaction request.

* * * * *